US010178610B2

(12) United States Patent
Chen

(10) Patent No.: US 10,178,610 B2
(45) Date of Patent: Jan. 8, 2019

(54) SMART HOME CONTROL METHOD AND SYSTEM BASED ON ALLJOYN TECHNOLOGY

(71) Applicant: HUIZHOU TCL MOBILE COMMUNICATION CO., LTD, HuiZhou, Guangdong (CN)

(72) Inventor: Kang Chen, HuiZhou (CN)

(73) Assignee: HUIZHOU TCL MOBILE COMMUNICATION CO., LTD, Guangdong (CN)

( * ) Notice: Subject to any disclaimer, the term of this patent is extended or adjusted under 35 U.S.C. 154(b) by 606 days.

(21) Appl. No.: 14/438,883

(22) PCT Filed: May 29, 2014

(86) PCT No.: PCT/CN2014/078735
§ 371 (c)(1),
(2) Date: Apr. 28, 2015

(87) PCT Pub. No.: WO2015/135259
PCT Pub. Date: Sep. 17, 2015

(65) Prior Publication Data
US 2016/0249286 A1    Aug. 25, 2016

(30) Foreign Application Priority Data
Mar. 13, 2014  (CN) .......................... 2014 1 0097055

(51) Int. Cl.
*G06F 15/177* (2006.01)
*H04W 48/20* (2009.01)
(Continued)

(52) U.S. Cl.
CPC ......... *H04W 48/20* (2013.01); *H04L 12/6418* (2013.01); *H04L 41/0846* (2013.01); *H04W 84/12* (2013.01)

(58) Field of Classification Search
CPC .......................... H04W 48/20; H04L 12/6418
(Continued)

(56) References Cited

U.S. PATENT DOCUMENTS

2007/0019609 A1* 1/2007 Anjum .............. H04L 29/12254
370/349
2013/0023262 A1* 1/2013 Zhang .................. H04W 48/18
455/418

(Continued)

FOREIGN PATENT DOCUMENTS

| CN | 101945493 | 1/2011 |
| CN | 102905396 | 1/2013 |
| WO | 2013082334 | 6/2013 |

*Primary Examiner* — Vivek Srivastava
*Assistant Examiner* — Atta Khan
(74) *Attorney, Agent, or Firm* — Mark M. Friedman

(57) ABSTRACT

A smart home control method and system based on Alljoyn technology is provided, the method includes: A, the controller searching a WIFI hotspot having an SSID started with a preset identification field; B, the controller connecting to the WIFI hotspot opened by the smart terminal, and duplicating configuration information of the target home WIFI hotspot network to the smart terminal; C, the controller calling a connection interface of the smart terminals, to connect the smart terminals to the target home WIFI hotspot network.

7 Claims, 4 Drawing Sheets

(51) Int. Cl.
*H04L 12/24* (2006.01)
*H04L 12/64* (2006.01)
*H04W 84/12* (2009.01)

(58) Field of Classification Search
USPC .......................................................... 709/222
See application file for complete search history.

(56) References Cited

U.S. PATENT DOCUMENTS

| | | |
|---|---|---|
| 2014/0151813 A1 | 6/2014 | Cavgalar |
| 2014/0156819 A1 | 6/2014 | Cavgalar |
| 2014/0156844 A1 | 6/2014 | Cavgalar |
| 2014/0157334 A1 | 6/2014 | Cavgalar |
| 2014/0328209 A1* | 11/2014 | Lu ..................... H04W 72/048 370/254 |
| 2015/0023183 A1* | 1/2015 | Ilsar .................... H04W 48/16 370/244 |
| 2015/0317467 A1* | 11/2015 | Rattner ................. G06F 21/34 726/5 |
| 2016/0073250 A1* | 3/2016 | Moore ................. H04W 48/16 370/338 |

\* cited by examiner

SMART HOME CONTROL METHOD AND SYSTEM BASED ON ALLJOYN TECHNOLOGY

BACKGROUND OF THE INVENTION

1. Field of the Invention

The present invention relates to a field of establishing smart homes, and more specifically to a smart home control method and system based on Alljoyn technology.

2. Description of the Prior Art

In recent years, development of the internet of things has been pushed strongly by the government, the smart home field has also faced great development opportunities. Therefore, all kinds of smart home devices and smart home controllers have come forth in current markets. However, the smart home system and devices currently have the following two problems:

First, the system configuration progress is complicated, generally needs professional construction personnel for the wiring in the early stage, and manual configuration or addition operation of the smart home controller is required for each controlled smart terminal device (such as smart home appliances, security devices, etc.). Second, a variety of brands of smart home devices are very difficult to make compatible with each other. Typically, the device manufacturers of different device need to redevelop a protocol compatible for the devices of both parties, and a long debug cycle time is required, then connection between the devices can be completed. These problems have seriously restricted the development of smart home technology.

Alljoyn is an abbreviation of "All to join in the fun". Alljoyn technology is an open source software project developed and maintained by Quic (Qualcomm innovation center). It is a cross-platform software framework which is device-independent, and supports multiple programming languages and various short distance wireless communication technologies. It currently supports WiFi (Wireless-Fidelity), WiFi direct and Bluetooth. Alljoyn technology has the advantages of easy device detection and simple and open interface definitions. These advantages also provide a broad application prospect for establishing smart homes based on the Alljoyn technology.

SUMMARY OF THE INVENTION

To overcome the above-mentioned disadvantages, the present invention aims to provide a smart home control method and system based on Alljoyn technology for resolving the problems existing in the current smart home system configuration, i.e. complexity, and difficult to be compatible with.

The technical schemes of the present invention are illustrated hereunder:

A smart home control method based on Alljoyn technology, which is used for a standard terminal device based on the Alljoyn technology comprising a smart terminal and a controller, the method comprising the following steps: A, scanning and searching nearby to determine whether a WIFI hotspot having an SSID started with a preset identification field and opened by the smart terminal exists after the controller is connected to a target home WIFI hotspot network, if so, executing step B; B, connecting the controller to the WIFI hotspot opened by the smart terminal, and duplicating configuration information of the target home WIFI hotspot network to the smart terminal by calling a configuration interface of the smart terminal; C, remotely calling a connection interface of the smart terminal by the controller to connect to the target home WIFI hotspot network by using the configuration information of the target home WIFI hotspot network; D, stopping scanning and reconnecting the controller to the target home WIFI hotspot network if the controller does not find any WIFI hotspot having the SSID started with the preset identification field and opened by the smart terminal after scanning and searching; E, connecting all the smart terminals to the target home WIFI hotspot network one by one in order to allow the controller to search all the smart terminals.

In the smart home control method based on Alljoyn technology, the preset identification field is AJ_.

In the smart home control method based on Alljoyn technology, before the step A, further comprising: trying by the smart terminal to connect to the target home WIFI hotspot network, when the connection fails, the smart terminal opening the WIFI hotspot of its own, an SSID of the WIFI hotspot is started with the preset identification field.

In the smart home control method based on Alljoyn technology, the SSID of the WIFI hotspot opened by the smart terminals is formed by the preset identification field and a MAC address of net card thereof.

In the smart home control method based on Alljoyn technology, the smart terminal opens the WIFI hotspot of its own after the smart terminal tries but fails to connect to the target smart home WIFI hotspot network for a plurality of times in a preset time.

In the smart home control method based on Alljoyn technology, the step of remotely calling a connection interface of the smart terminal comprises: acquiring a definition of the connection interface of the smart terminal by the controller, and remotely calling the connection interface of the smart terminal by using the definition of the connection interface.

In the smart home control method based on Alljoyn technology, the step C further comprises: remotely calling the connection interface of the smart terminal by the controller to allow the smart terminal to close the WIFI hotspot opened by itself.

In the smart home control method based on Alljoyn technology, the controller is a general smart device based on a Linux, Windows, or IOS operating system.

A smart home control method based on Alljoyn technology, the method for standard terminal devices based on Alljoyn technology comprising smart terminals and a controller, the method comprises the following steps: A, scanning and searching nearby to determine whether a WIFI hotspot having an SSID started with a preset identification field and opened by the smart terminal exists after the controller is connected to a target home WIFI hotspot network, if so, executing step B; B, connecting the controller to the WIFI hotspot opened by the smart terminal, and duplicate configuration information of the target home WIFI hotspot network to the smart terminal by calling a configuration interface of the smart terminal; C, remotely calling a connection interface of the smart terminal by the controller to connect to the target home WIFI hotspot network by using the configuration information of the target home WIFI hotspot network.

In the smart home control method based on Alljoyn technology, the preset identification field is AJ_.

In the smart home control method based on Alljoyn technology, before the step A, further comprising: trying by the smart terminal to connect to the target home WIFI hotspot network, when the connection failing, the smart terminal opening a WIFI hotspot of its own, an SSID of the WIFI hotspot is started with the preset identification field.

In the smart home control method based on Alljoyn technology, the SSID of the WIFI hotspot opened by the smart terminal is formed by the preset identification field and a MAC address of a net card thereof.

In the smart home control method based on Alljoyn technology, the smart terminal opens the WIFI hotspot of its own after the smart terminal tries but fails to connect to the target smart home WIFI hotspot network for a plurality of times in a preset time.

In the smart home control method based on Alljoyn technology, the step of remotely calling a connection interface of the smart terminal by the controller comprises: acquiring a definition of the connection interface of the smart terminal by the controller, and remotely calling the connection interface of the smart terminal by using the definition of the connection interface.

In the smart home control method based on Alljoyn technology, the step C further comprises: remotely calling the connection interface of the smart terminal by the controller to make the smart terminal close the WIFI hotspot opened by itself.

In the smart home control method based on Alljoyn technology, stopping scanning and reconnecting the controller to the target home WIFI hotspot network if the controller does not find any WIFI hotspot having the SSID started with the preset identification field and opened by the smart terminal after scanning and searching.

In the smart home control method based on Alljoyn technology, the controller is a general smart device based on a Linux, Windows, or IOS operating system.

In the smart home control method based on Alljoyn technology, the method further comprises the following step: connecting all the smart terminals to the target home WIFI hotspot network one by one in order to allow the controller to search all the smart terminals.

A smart home control system based on Alljoyn technology, the system comprises a controller and smart terminals, the controller comprises: a WIFI hotspot scanning and identifying module, used for scanning and searching nearby for whether a WIFI hotspot opened by the smart terminals and SSID started with a preset identification field exists after being connected to a target home WIFI hotspot network, and used for connecting to the WIFI hotspot opened by the smart terminal if the WIFI hotspot opened by the smart terminal and SSID started with the preset identification field exists; a configuration interface calling module, used for duplicating configuration information of the target home WIFI hotspot network to the smart terminal by calling a configuration interface of the smart terminal; a connection interface calling module, used for remotely calling a connection interface of the smart terminal to connect to the target home WIFI hotspot network by using the configuration information of the target home WIFI hotspot network.

Beneficial Effect: The present invention provides a smart home control method and system based on Alljoyn technology. The system is based on an underlying WIFI wireless transmission technology of Alljoyn, which through its easy-device detection and simple and open interface definitions, makes the smart home system configuration process simple and without professional operation, thereby simplifying the traditional smart home system configuration process. In addition, the smart home control system through the Alljoyn technology simple interface definitions also solves the problem that the smart home device which uses different brands is hard to compatible with, and joint debugging work from the device manufacturers is not needed.

DETAILED DESCRIPTION OF THE PREFERRED EMBODIMENTS

The present invention provides a smart home control method and system based on the Alljoyn technology. For the purpose of illustrating the present invention, technical scheme, and the effects more clearly, further details of the present invention are provided below. It should be understood that the preferred embodiment described herein is only to explain the present invention, and is not used to limit the present invention.

Figure 1:
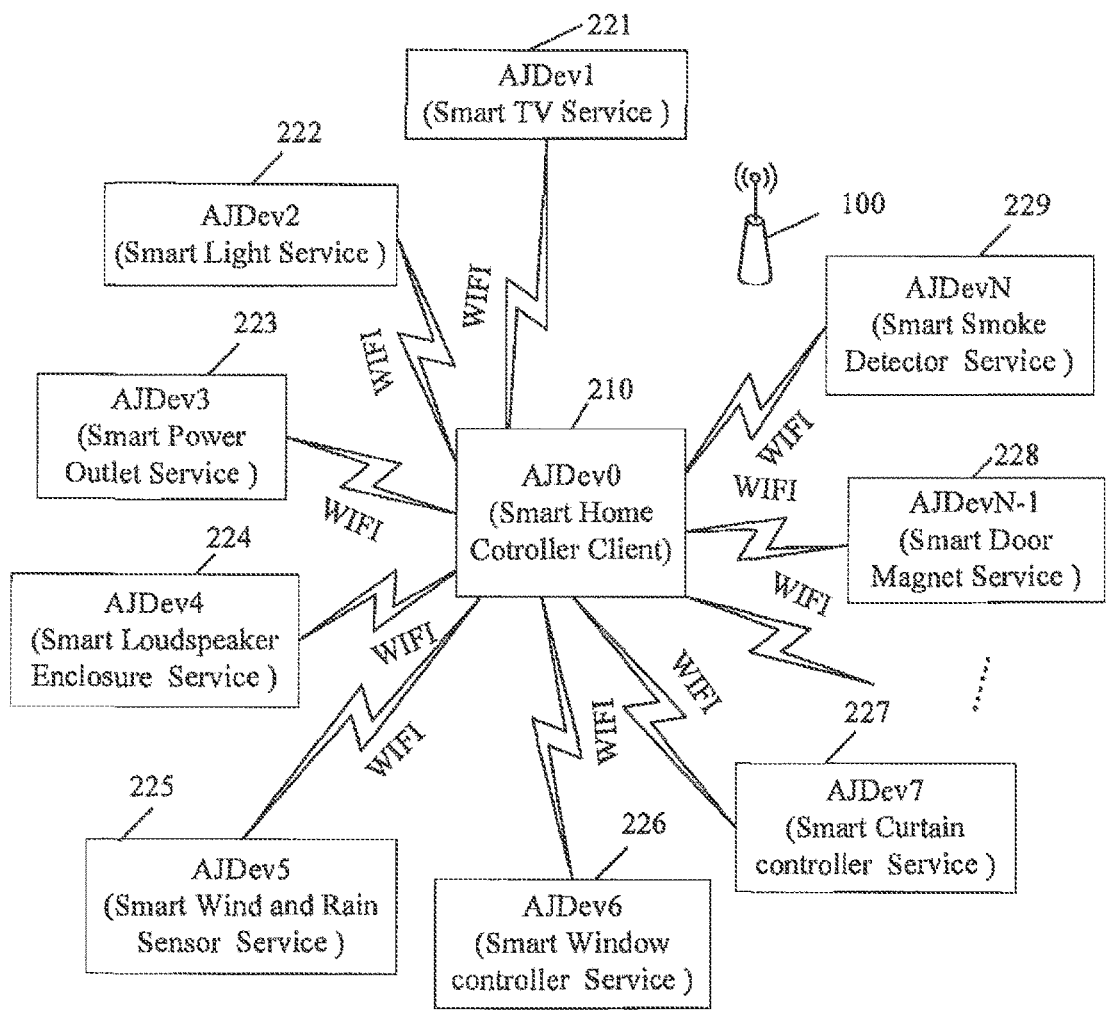
FIG. 1 is a topology diagram showing a smart home control system based on the Alljoyn technology according to a preferred embodiment of a present invention.

The present invention of the smart home control system based on the Alljoyn technology is as shown in FIG. 1. The system comprises a standard terminal device based on Alljoyn technology such as a smart terminal device and a controller, which is also called AJDev (Alljoyn Device). Concretely, the system comprises a controller and at least one smart terminal. The controller can also be expressed as a client; it sends instructions, and calls a specific function service, acted as a function caller. The smart terminal is also called a service; it receives the instructions, and provides the specific function, acted as a function executor.

A WIFI hotspot 100 may be a common WIFI router, and also may be one AJDev opened portable WIFI hotspot function. Each AJDev is able to P2P communicate and exchange information. AJDev0 (Controller Client) 210 may be one common smart device based on a Linux, Windows, or IOS operating system, such as a PC, smart phone, panel computer, etc.; Of course, a plurality of devices similar to the AJDev 0 (Control Client) may exist. The smart terminal comprises current smart devices in the smart home, such as AJDev 1 (Smart TV Service) 221, AJDev 2 (Smart Light Service) 222, AJDev 3 (Smart Power outlet Service) 223, AJDev 4 (Smart Loudspeaker Enclosure Service) 224, AJDev 5 (Smart wind and rain Sensor Service) 225, AJDev 6 (Smart Window controller Service) 226, AJDev 7 (Smart Curtain controller Service) 227 . . . AJDev N-1 (Smart door Magnet Service) 228, AJDev N (Smart Smoke Detector Service) 229.

Figure 2:
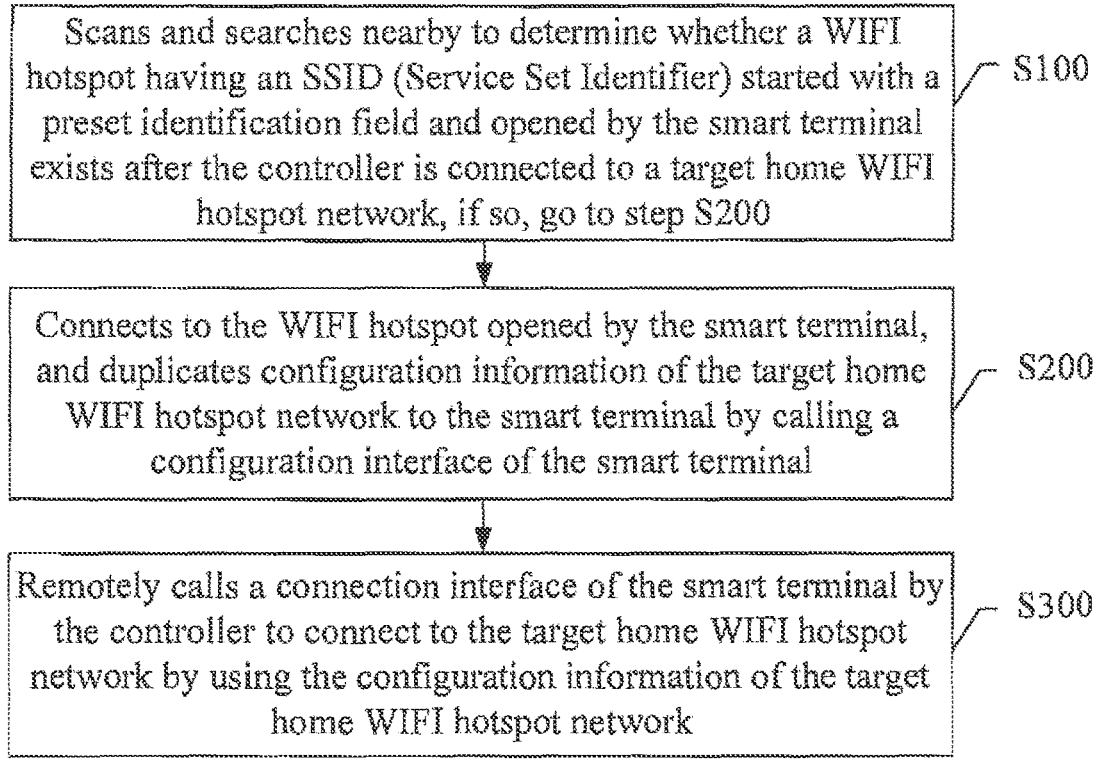
FIG. 2 is a flow chart of the smart home control method based on the Alljoyn technology according to the present invention.

The smart home control method based on the Alljoyn technology shown in FIG. 2, illustrates how to build the system from Zero-configuration. The method is for a standard terminal device based on Alljoyn technology comprising a smart terminal and a controller. The method comprises the following steps:

S100, scans and searches nearby to determine whether a WIFI hotspot having an SSID (Service Set Identifier) started with a preset identification field and opened by the smart terminal exists after the controller is connected to a target home WIFI hotspot network, if so, go to step S200.

In a preferred embodiment, a SSID of the WIFI hotspot started with the preset identification field here mentions that the there is "AJ_" in the SSID. The target home WIFI hotspot network may be a network formed by a common WIFI router, or may be a network formed by an AJDev opened portable hotspot function in the system.

Further, before the Step S100 further comprises:

The smart terminal tries to connect to the target smart home WIFI hotspot network, and when the connection fails, the smart terminal opens a WIFI hotspot of its own, and the SSID of the WIFI hotspot is started with the preset identification field. In particular, the SSID of the WIFI hotspot opened by the smart terminals is formed by the preset identification field and a MAC (Media Access Control) address of a net card thereof.

The above process may be described as: the smart terminal opens the WIFI hotspot of its own after the smart terminal tries but fails to connect to the target smart home WIFI hotspot network for a plurality of times in a preset time.

In particular, it checks whether an available wireless AP (wireless access point) hotspot exists after each smart terminal (AJDev Service) device is powered up, if so tries to connect, if the connection success it means the AJDev Service device has already exists in the target home WIFI network. If the connection fails, and in a period of time cannot connect to the available wireless AP hotspot, the AJDev Service device opens a portable wireless hotspot of its own, and configures itself as a wireless soft AP, the network ID is set as "AJ_", and is given a MAC physical address (such as AJ_00:66:65:23:45); the password is preset to be open.

S200, the controller connects to the WIFI hotspot opened by the smart terminal, and duplicates configuration information of the target home WIFI hotspot network to the smart terminal by calling a configuration interface of the smart terminal.

In addition, when the controller stops scanning and reconnects to the target home WIFI hotspot network if the controller does not find any WIFI hotspot having the SSID started with the preset identification field and opened by the smart terminal after scanning and searching.

S300, remotely calls a connection interface of the smart terminal by the controller to connect to the target home WIFI hotspot network by using the configuration information of the target home WIFI hotspot network.

Further, remotely calling the connection interface of the smart terminal by the controller in the step S300 in particular that the controller acquires a definition of the connection interface of the smart terminal, and uses the definition of the connection interface to remotely call the connection interface of the smart terminal.

Further, the step S300 comprises: remotely calling the connection interface of the smart terminal by the controller to allow the smart terminal to close the WIFI hotspot opened by itself.

In a preferred embodiment, a user uses the controller (AJDev Client device) through a screen, or even a touch screen, to call a system configuration interface, chooses a target home WIFI wireless hotspot, and inputs the correct password to ensure successful connection. After being connected to the target WIFI successfully, and opening an application program of the AJDev Client, the controller automatically scans all the WIFI hotspot networks started with "AJ_", and adds the same one by one to the WIFI networks of the AJDev service device that opens portable WIFI hotspots. Then the Client duplicates the target home WIFI hot information of its own and configures the smart terminal (AJDev Service device) by using the configuration interface provided by Alljoyn technology, to allow the smart terminal to acquire the configuration information of the target home WIFI hotspots. After the AJDev Client device configures the AJDev Service device, the portable WIFI hotspots are closed by using the connection interface provided by Alljoyn technology, and it is connected to the target home WIFI hotspot network by using the configured target home WIFI information.

AJDev Client device repeats the above steps in the preferred embodiment, until no new WIFI hotspot network starting with "AJ_" can be found, then stops scanning wireless AP, and connects to an initial target home WIFI network, so that all the AJDev devices at home may be added to one network automatically.

Figure 3:
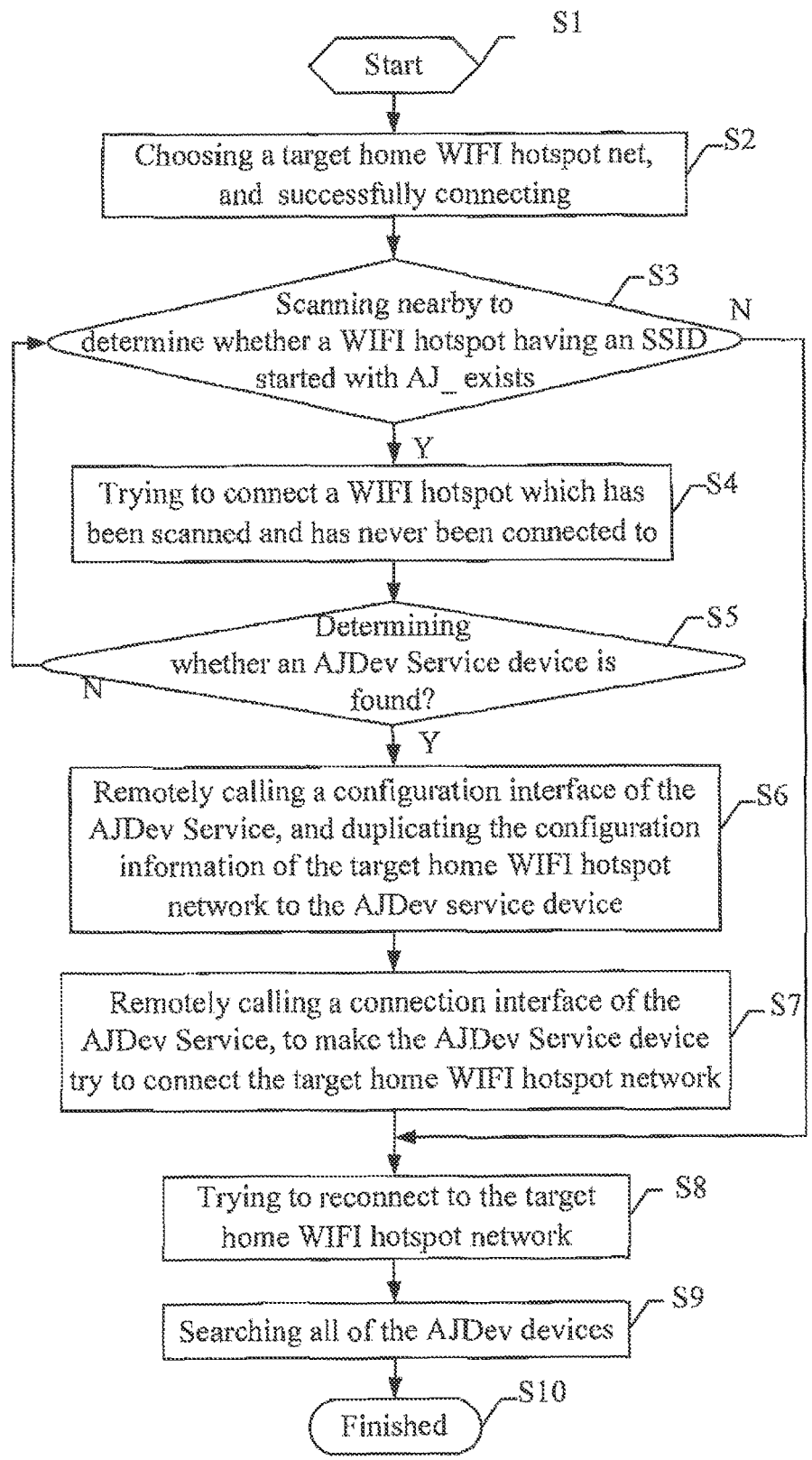
FIG. 3 is a flow chart of a smart home control method based on the Alljoyn technology according to the preferred embodiment of the present invention.

FIG. 3 illustrates the critical steps in the smart home control method based on the Alljoyn technology, the detail of the steps are as follows:

S1, start.

S2, choosing a target home WIFI hotspot network, and successfully connecting.

S3, scanning nearby to determine whether a WIFI hotspot having an SSID started with AJ_exists. If so, go to step S4, if not so, go to Step S8.

S4, trying to connect a WIFI hotspot which has been scanned and has never been connected to.

S5, determining whether an AJDev Service device is found? If founds, the WIFI hotspot opened by the AJDev Service device is connected successfully, go to step S6; if no founds, go back to step S3.

S6, remotely calling a configuration interface of the AJDev Service, and duplicating the configuration information of the target home WIFI hotspot network to the AJDev service device.

S7, remotely calling a connection interface of the AJDev Service to make the AJDev Service device try to connect to the target home WIFI hotspot network.

S8, trying to reconnect to the target home WIFI hotspot network. That is the controller is connected to the initial target home WIFI hotspot network, and connected to one network with other AJDev Service devices.

S9, searching all of the AJDev devices. Through connecting all the AJDev devices (Smart terminal) in the smart home system one by one to one WIFI network, the controller can search and find all of the AJDev devices.

S10, finished.

Figure 4:
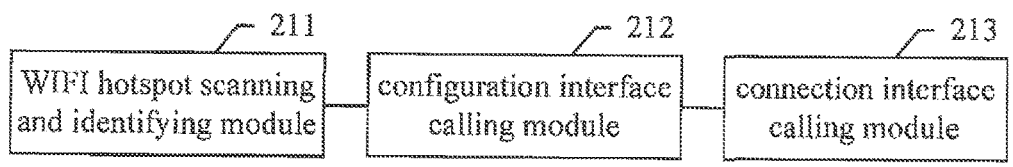
FIG. 4 is a principle block diagram of a smart home control system based on the Alljoyn technology according to the present invention.

Please refer to a preferred embodiment shown in FIG. 4, the system comprises a controller, which comprises:

A WIFI hotspot scanning and identifying module 211, used for scanning and searching nearby to determine whether a WIFI hotspot having an SSID started with a preset identification field and opened by the smart terminals exists after the controller is connected to a target home WIFI hotspot network, and used for connecting to the WIFI hotspot opened by the smart terminal if the WIFI hotspot having the SSID started with the preset identification field and opened by the smart terminals exists.

A configuration interface calling module 212, used for duplicating configuration information of the target home WIFI hotspot network to the smart terminal by calling a configuration interface of the smart terminal.

A connection interface calling module 213, used for remotely calling a connection interface of the smart terminal, to connect to the target home WIFI hotspot network by using the configuration information of the target home WIFI hotspot network.

The present invention provides a smart home control method and system based on Alljoyn technology. The system is based on an underlying WIFI wireless transmission technology of Alljoyn, which through its easy-device detection and simple and open interface definitions, makes the smart home system configuration process simple and without professional operation, thereby simplifying the traditional smart home system configuration process. In addition, the smart home control system through the Alljoyn technology simple interface definitions also solves the problem that the smart home device which uses different brands is hard to compatible with, and joint debugging work from the device manufacturers is not needed.

It should be understood that the present invention has been described with reference to certain preferred and alternative embodiments which are intended to be exemplary only and do not limit the full scope of the present invention as set forth in the appended claims.

What is claimed is:

1. A smart home control method based on Alljoyn technology, which is used for a standard terminal device based on the Alljoyn technology comprising a smart terminal and a controller, the method comprising the following steps:

trying, by the smart terminal, to connect to a target home WIFI hotspot network, when a connection fails, the smart terminal opening a WIFI hotspot of its own, an SSID of the WIFI hotspot is started with a preset identification field;

A, scanning and searching nearby to determine whether the WIFI hotspot having an SSID started with the preset identification field and opened by the smart terminal exists after the controller is connected to the target home WIFI hotspot network, if so, executing step B;

B, connecting the controller to the WIFI hotspot opened by the smart terminal, and duplicating configuration information of the target home WIFI hotspot network to the smart terminal by calling a configuration interface of the smart terminal;

C, acquiring a definition of a connection interface of the smart terminal by the controller, and remotely calling the connection interface of the smart terminal by using the definition of the connection interface, to connect to the target home WIFI hotspot network by using the configuration information of the target home WIFI hotspot network, and to make the smart terminal close the WIFI hotspot opened by itself;

D, stopping scanning and reconnecting the controller to the target home WIFI hotspot network if the controller does not find any WIFI hotspot having the SSID started with the preset identification field and opened by the smart terminal after scanning and searching;

E, connecting all the smart terminals to the target home WIFI hotspot network one by one in order to allow the controller to search all the smart terminals;

wherein the SSID of the WIFI hotspot opened by the smart terminal is according to the preset identification field and a MAC address of a net card thereof, and the preset identification field is AJ_.

2. The smart home control method based on Alljoyn technology as claimed in claim 1, wherein the smart terminal opens the WIFI hotspot of its own after the smart terminal tries but fails to connect to the target smart home WIFI hotspot network for a plurality of times in a preset time.

3. The smart home control method based on Alljoyn technology as claimed in claim 1, wherein the controller is a general smart device based on a Linux, Windows, or IOS operating system.

4. The smart home control method based on Alljoyn technology as claimed in claim 1, wherein the step of remotely calling a connection interface of the smart terminal by the controller comprises:

acquiring a definition of the connection interface of the smart terminal by the controller, and remotely calling the connection interface of the smart terminal by using the definition of the connection interface.

5. The smart home control method based on Alljoyn technology as claimed in claim 1, wherein the step C further comprises:

remotely calling the connection interface of the smart terminal by the controller to make the smart terminal close the WIFI hotspot opened by itself.

6. The smart home control method based on Alljoyn technology as claimed in claim 1, wherein stopping scanning and reconnecting the controller to the target home WIFI hotspot network if the controller does not find any WIFI hotspot having the SSID started with the preset identification field and opened by the smart terminal after scanning and searching.

7. The smart home control method based on Alljoyn technology as claimed in claim 1, wherein the method further comprises the following step:

connecting all the smart terminals to the target home WIFI hotspot network one by one, in order to allow the controller to search all the smart terminals.

* * * * *